United States Patent Office 3,280,043
Patented Oct. 18, 1966

3,280,043
CURING OF EPOXY RESINS WITH $N^1,N^3$-DIALKYL-DIETHYLENETRIAMINE
John R. Larson, Wood Dale, and Charles M. Hayes, Roselle, Ill., assignors to Universal Oil Products Company, Des Plaines, Ill., a corporation of Delaware
No Drawing. Filed July 30, 1962, Ser. No. 213,108
8 Claims. (Cl. 260—2)

This invention relates to the curing of epoxy resins and more particularly to the use of a novel curing agent therefor.

Epoxy resins have been found to be of great utility in numerous applications. These resins are useful as bonding agents and laminates as, for example, in the lamination of glass cloth, in bonding metal to metal, metal to wood, wood to wood, etc. The resins have found wide use as protective surface coatings and also are used in plastic tooling, insulation, paints, etc. Regardless of the particular use, the epoxy resins are furnished as viscous liquids, semi-solids or solids, and subsequently are cured either at ambient temperature or by heating in the presence of a suitable curing agent.

The epoxy resins are formed by the reaction of a 1,2-epoxy compound and a dihydric phenol or polyalcohol. The preferred 1,2-epoxy resins are prepared by the reaction of epichlorohydrin with Bis-Phenol-A (2,2-bis-(4-hydroxyphenyl)-propane), generally in alkaline solution. Epoxy resins also may be prepared from other 1,2-epoxy compounds including, for example, 1,2-epi-4-chlorobutane, 1,2-epi-5-chloropentane, 1,2-epi-6-chlorohexane, dichlorohydrin, butadiene dioxide, polyglycidyl ethers of ethylene glycol, propylene glycol, trimethylene glycol, diethylene glycol, triethylene glycol, dipropylene glycol, glycerol, etc. Other dihydric phenols may be employed, including resorcinol, catechol, hydroquinone, 4,4'-dihydroxybenzophenone, 1,1-bis-(4-hydroxyphenyl)-ethane, 1,1 - bis - (4-hydroxyphenyl)-butane, 2,2 - bis - (4-hydroxyphenyl)-butane, (Bis-Phenol-B), 1,5-dihydroxynaphthylene, etc. Epoxy resins also may be prepared by the reaction of a 1,2-epoxy compound and particularly epichlorohydrin with polyalcohols including, for example, ethylene glycol, propylene glycol, trimethylene glycol, diethylene glycol, triethylene glycol, glycerol, erythritol, pentaerythritol, mannitol, sorbitol, polyallyl alcohol, polyvinyl alcohol, etc. It is understood that the epoxy resins formed from the various reactants mentioned above are not necessarily equivalent and, furthermore, that the exact composition of the epoxy resin is dependent upon the molecular proportions of the epoxy compound and dihydric phenol or polyalcohol employed in its preparation.

Regardless of the method of preparation, the epoxy resin must be cured in order to form the desired final product. In many cases, the epoxy resin is recovered as a viscous liquid and is converted by curing into a final hard product. In other cases, the epoxy resin is a semisolid or solid which is soluble in suitable organic solvents or liquefied by mild heating and then is converted into the desired final product by proper curing. As hereinbefore set forth, the present invention provides a novel agent for use in the curing of epoxy resins.

In accordance with the present invention, curing of epoxy resins is effected in the presence of a curing agent comprising a $N^1,N^3$-dialkyldiethylenetriamine.

Various amine compounds have been suggested heretofore for use as curing agents for epoxy resins. One of the most prominent curing agents of the prior art is diethylenetriamine. It now has been found that the use of $N^1,N^3$-dialkyldiethylenetriamine produces surprising results in the curing of epoxy resins. The surprising result obtained with $N^1,N^3$-dialkyldiethylenetriamine is the amazing flexibility of the resultant cured resin. A steel plate, coated and cured in this manner, was bent on a conventional mandrel, twisted into various configurations and even hit with a hammer, but the epoxy coating did not crack or split off. In contrast, the same epoxy resin cured with diethylenetriamine cracked and split off when subjected to the same bending operation. It is readily apparent that the amazing flexibility of the epoxy coating contributed by the novel curing agent of the present invention is of extreme importance in providing coated surfaces which may be subjected to various and severe working operations without cracking of the coating.

From the brief description hereinbefore set forth, it will be seen that the improved results of the present invention are obtained by using a curing agent of critical configuration. It is essential that both of the terminal nitrogen atoms are substituted with an alkyl group and also that the amine portion of the molecule is diethylenetriamine. The criticality as to the substitutions on the nitrogen atoms has been referred to above. The criticality as to the amine portion will be further illustrated in a comparison of the novel curing agents of the present invention with alkylated ethylenediamine.

Any suitable $N^1,N^3$-dialkyldiethylenetriamine is used in accordance with the present invention. In a preferred embodiment, each of the alkyl groups contains from about 3 to about 12 and still more preferably from about 3 to about 8 carbon atoms. Accordingly, particularly preferred curing agents comprise $N^1,N^3$-dipropyldiethylenetriamine, $N^1,N^3$-dibutyldiethylenetriamine, $N^1,N^3$-diamyldiethylenetriamine, $N^1,N^3$-dihexyldiethylenetriamine, $N^1,N^3$-diheptyldiethylenetriamine and $N^1,N^3$-dioctyldiethylenetriamine. Other curing agents comprise $N^1,N^3$-dinonyl-diethylenetriamine, $N^1,N^3$-didecyldiethylenetramine, $N^1,N^3$ - diundecyldiethylenetriamine, $N^1,N^3$ - didodecyldiethylenetriamine, etc. In another embodiment, alkyl groups comprising methyl, ethyl or tridecyl through eicosyl may be used.

In a particularly preferred embodiment, the alkyl group is a secondary alkyl group and, accordingly, the particularly preferred curing agents comprise $N^1,N^3$-diisopropyldiethylenetriamine, $N^1,N^3$ - di - sec - butyldiethylenetriamine, $N^1,N^3$-di-sec-amyldiethylenetriamine, $N^1,N^3$-di-sec-hexyldiethylenetriamine, $N^1,N^3$-di-sec-heptyldiethylenetriamine, $N^1,N^3$-di-sec-octyldiethylenetriamine, etc.

The curing agents of the present invention are prepared in any suitable manner. In a particularly preferred embodiment, these are prepared by reductive alkylation. When a disecalkyl derivative is desired, a ketone is used. Accordingly, $N^1,N^3$-di-sec-butyldiethylenetriamine is prepared by reductive alkylation of diethylenetriamine with methyl ethyl ketone. Similarly, $N^1,N^3$-di-sec-amyldiethylenetriamine is prepared by reductive alkylation of diethylenetriamine with methyl propyl ketone or diethyl ketone. $N^1,N^3$-di-sec-octyldiethylenetriamine is prepared by the reductive alkylation of diethylenetriamine with methyl hexyl ketone, ethyl amyl ketone, etc. When a $N^1,N^3$-di-n-alkyldiethylenetriamine is desired, the corresponding aldehyde is used in place of the ketone.

Any suitable catalyst is used in the reductive alkylation including those containing platinum, palladium, cobalt, nickel, molybdenum, etc. Another catalyst used for this reaction is a mixture of the oxides of chromium, copper and barium. In general, the reaction is effected at an elevated temperature of from about 200° to about 500° F. and a hydrogen pressure of from about 50 to about 2000 pounds or more per square inch. It is understood that any other suitable method of preparing the $N^1,N^3$-dialkyldiethylenetriamine may be used in accordance with the present invention.

While the symmetrically substituted $N^1,N^3$-diethylenetriamines hereinbefore set forth are preferred, in another embodiment the alkyl groups attached to the nitrogen atoms may be of different chain lengths and/or configurations. In still another embodiment, a mixture of different symmetrically substituted diethylenetriamines and/or a mixture of different unsymmetrically substituted diethylenetriamines may be used. In these embodiments it is preferred that the alkyl groups contain from 3 to 12 carbon atoms each, although it is understood that one of the alkyl groups may contain 1, 2 or from 13 to 20 carbon atoms.

In addition to the important advantage of extreme flexibility as hereinbefore set forth, the curing agent of the present invention also offers the advantage of being less toxic than diethylenetriamine. Accordingly, the curing agent is handled by the workers with less hazard.

From the above description, it will be noted that a number of different curing agents may be used in accordance with the present invention. It is understood that the different curing agents are not necessarily equivalent in the same or different epoxy resins, but all of them will serve to produce a cured resin of increased flexibility. The selection of the specific curing agent will depend upon the specific epoxy resin and upon the final product desired. Certain of the agents will be more effective in some epoxy resins, while others will be more effective in other epoxy resins. Furthermore, in the preparation of the curing agents a mixture of isomers may be produced and, in most cases, the mixture is used as such, thereby avoiding the additional time and expense of separating the individual compounds from the mixture.

In another embodiment of the invention the curing agent is used in admixture with other curing agents. In this embodiment, the curing agent of the present invention preferably is used in a concentration of at least 50% by weight of the total curing agents and more particularly in a concentration of from about 60% to about 95% by weight of the total thereof. A specific illustration in this embodiment is the use of a mixture of 75% by weight of $N^1,N^3$-di-sec-alkyldiethylenetriamine and 25% by weight of diethylenetriamine. This mixture serves to lower the temperature of the curing. It is understood that any other suitable curing agent may be used in admixture with the curing agent of the present invention. Examples of other curing agents include diethylaminopropylamine, triethylenetetramine, dicyanamide, m-phenylenediamine, methylenedianiline, phthalicanhydride, hexahydrophthalicanhydride, dimethylaminoethanol, diethylaminoethanol, etc.

Curing of the epoxy resin is effected in any suitable manner. The temperature and time of heating and concentration of curing agent will depend upon the specific epoxy resin employed. The properties of the epoxy resin itself depend upon the number of epoxy groups in the resin and the method of manufacture. In a preferred embodiment, the curing agent is used in a concentration of equivalent weight to the epoxy resin. This may be calculated on the basis of the $N^1,N^3$-dialkyldiethylenetriamines having three active hydrogens and a molecular weight depending upon the particular curing agent employed. This, in turn, is related to the epoxy equivalent weight of the specific resin. However, it is understood that a lower or higher concentration of the curing agent may be employed and generally may be expressed as a range of from about 5% to about 200% by weight of the resin and more particularly within the range of from about 5% to about 100% by weight of the resin.

The specific curing procedure will depend upon the particular application of the epoxy resin. In one embodiment the curing agent is commingled with the epoxy resin and the mixture is heated and then placed in suitable molds and allowed to set into the desired pattern and/or the mixture is heated in the molds. In another embodiment the curing agent is mixed with the epoxy resin and the mixture is used as a bonding agent in laminates which may be heated and pressed at the same time, or the heating may precede the pressing. It is understood that any suitable method of effecting the curing may be employed and, as hereinbefore set forth, the specific procedure will depend upon the particular application of the epoxy resin.

When desired, a suitable solvent, filler, thioxotroping agent, diluent, etc., may be incorporated in the epoxy resin and/or the curing agent prior to curing. When the resin is supplied as a solid, it may be dissolved in a suitable solvent, and the curing agent intimately admixed therein. Any suitable solvent may be employed. Illustrative solvents include ketones as acetone, methylethyl ketone, methylisobutyl ketone, isophorone, diacetone alcohol, etc., ether alcohols as methyl, ethyl or butyl ether of ethylene glycol or diethylene glycol, Cellosolve, etc., chlorinated solvents such as trichloropropane, trichlorobutane, chloroform, etc. The filler to be employed will depend upon the purpose for which the epoxy resin is to be used. Illustrative fillers include powdered metals and metal oxides such as powdered iron oxide, aluminum oxide, etc., copper, aluminum, etc., silica, inorganic silicates, sand, glass, asbestos, carbon, calcium carbonate, etc. In order to prevent the filler from settling during curing, an organophilic thixotroping agent may be employed and this may be selected from any of the suitable commercially available materials. Diluents such as hydrocarbons including, for example, benzene, toluene, xylene, ethylbenzene, cumene, etc., may be employed, particularly with liquid resins. This serves to reduce the viscosity and to increase the useful pot life without seriously affecting the final properties of the resin.

When desired, the epoxy resin, either with or without a solvent, may be heated mildly prior to admixing the curing agent therewith. The mild heating generally will be within the range of from about 23° to 60° C. or more. It is important that the curing agent be intimately mixed with the resin, and this may be accomplished by hand mixing using a paddle, particularly in batch preparations, by the use of a mechanically rotating blade in continuous or batch preparations, or in any suitable manner.

The temperature of curing will range from atmospheric to an elevated temperature of 300° C. or more. Usually the temperature will be within the range of from about 50° to about 200° C. The time of heating also will depend upon the particular epoxy resin and curing agent employed, as well as the use to be made of the resin. The time generally will be from about 10 minutes to 20 hours or more, depending upon whether it is a fast or slow cure. In general, shorter times are employed with higher temperatures and, likewise, longer times with lower temperatures. While the curing may be effected at atmospheric pressure, superatmospheric pressure may be utilized in the curing and may range up to 5000 pounds or more per square inch. The curing is an exothermic reaction and, when desired, means for controlling the heat of reaction may be employed.

The following examples are introduced to illustrate further the novelty and utility of the present invention but not with the intention of unduly limiting the same.

EXAMPLE I

The curing agent of this example is $N^1,N^3$-di-sec-butyldiethylenetriamine. The epoxide resin used in this example is marketed under the trade name of "Epon 828" by the Shell Chemical Corporation. This resin is a liquid at room temperature and is said to have a viscosity at 25° C. of 100–160 poises, a maximum Gardner color of 8, an epoxide equivalent (grams of resin containing 1 gram equivalent of epoxide) of 175–210 and a weight of 9.7 gallons per pound at 20° C.

In order to properly evaluate the curing agent, conventional analyses were made and are reported in the following table. For comparative purposes, similar analyses of a system using diethylentriamine also are reported in the following table. In addition, the following table reports the analyses when using a mixture of 75% by weight of $N^1,N^3$-di-sec-butyldiethylenetriamine and 25% by weight of diethylenetriamine as the curing agent.

*Table I*

| Curing Agent | Parts of Curing Agent per 100 parts of resin | Solubility of Curing Agent in Resin | Peak Exotherm | Pot Life |
|---|---|---|---|---|
| $N^1, N^3$-di-sec-butyldiethylenetriamine | 37.8 | Soluble at room temperature. | Negligible | 10 hrs. |
| Diethylenetriamine | 10 | ____do____ | 143° C | 45 mins. |
| 75% $N^1, N^3$-di-sec-butyldiethylenetriamine and 25% diethylenetriamine. | 22.4 | ____do____ | About 46° C | 2.5 hrs. |

The solubility of the curing agent in the resin was determined by mixing the theoretical amount of the curing agent with the resin and determining the solubility at room temperature.

The peak exotherm and pot life were determined by mixing a 50 g. batch of mixture, recording the highest temperature attained and noting the length of time that the mixture remained pourable.

From the data in the above table, it will be seen that all three curing agents were soluble at room temperature in the resin and that the $N^1,N^3$-di-sec-butyldiethylenetriamine resulted in a lower peak exotherm and a longer pot life than diethylenetriamine.

EXAMPLE II

The different samples of the epoxy resin of Example I were cured with the three different curing agents described in Example I. The curing was effected as follows. The curing agent was stirred into the resin and, in order to avoid air bubbles in the system, the mixture of resin and curing agent was heated prior to pouring into the mold. Because the resin possesses adhesive properties, the molds first were coated with a conventional release agent. The molds then were placed in a convection oven and cured at 100° C. for 6 hours. The cured samples were removed from the molds and cut to the desired width on a fine toothed circular saw.

The cured samples of resin were subjected to conventional analyses, and the results are reported in the following table.

the cured resin samples were all about equal properties except for the very important difference that the samples cured with $N^1,N^3$-di-sec-butyldiethylenetriamine did not fracture when evaluated for flexural strength. In an attempt to obtain the flexural strength, ¼" samples were prepared and evaluated. Here again, there was no fracture in the samples.

EXAMPLE III

As hereinbefore set forth, a surprising result was obtained when using $N^1,N^3$-di-sec-butyldiethylenetriamine as a curing agent. This surprising result is evident somewhat from the data in Table II referring to flexural strength, but was more dramatically demonstrated as follows.

Each of the epoxy resin curing systems described in Example I were used to coat cold-rolled steel panels of 4" x 6" x 0.023". The panels were cured in a convection oven. After curing, the panels were bent on a conical mandrel (manufactured by Henry Zuhr Co.) to form a tight bend at one end of about ½" in radius and a larger bend at the other end of about 1½" in radius.

The panels coated with the resins cured with $N^1,N^3$-di-sec-butyldiethylenetriamine or with the mixture of $N^1,N^3$-di-sec-butyldiethylenetriamine and diethylenetriamine did not show any cracks or splitting off of the coating after being subjected to bending in the above manner. In contrast, the coating cured only with diethylenetriamine cracked and split off from the panel when subjected to bending in the manner described above. Patches of the coating on the last mentioned panel stuck to the steel

*Table II*

| Curing Agent | Tensile Strength, p.s.i. | Flexural Strength | Flexural Modulus | Heat Distortion Temperature ° C. | Shore D Hardness |
|---|---|---|---|---|---|
| $N^1, N^3$-di-sec-butyldiethylenetriamine | 8,500 / 8,570 / 8,880 | No fracture | $4.1 \times 10^5$ (⅛") / $5.97 \times 10^5$ (¼") | 54 | 82 |
| Diethylenetriamine | 8,830 / 9,213 / 9,620 | 14,700 / 17,650 (⅛") / 19,600 / 26,600 (¼") | $3.9 \times 10^5$ (⅛") / $6.8 \times 10^5$ (¼") | 84 | 88 |
| 75% $N^1, N^3$-di-sec-butyldiethylenetriamine and 25% diethylenetriamine. | | No fracture | $6.6 \times 10^5$ (¼") | | 85 |

The tensile strength was determined in accordance with ASTM method D638-61T except that the samples were not grooved. The samples consisted of straight strips 8" long, ½" wide and ⅛" thick. The data in the table are reported in pounds per square inch.

The flexural strength and flexural modulus were determined in accordance with ASTM method D790-61. The samples consisted of strips 8" x 1" x ⅛" or 8" x 1" x ¼" and the span was 2". The data in the table are reported in pounds per square inch.

The heat distortion temperature was determined in accordance with ASTM method D648-56. In each sample the specimen was loaded to a fiber stress of 264 pounds per square inch.

The hardness of the cured resin was determined on ⅛" strips in a Shore D durometer.

From the data in the above table, it will be seen that plate, but most of the coating came away from the steel panel and some of it cracked off.

In order to further test the coating cured with $N^1,N^3$-di-sec-butyldiethylenetriamine, other steel panels coated in this manner were twisted into various configurations. In all cases, the coatings did not crack or strip off the steel panels. As an even more severe test, the steel panel was hit with a hammer and, here again, did not crack the coating.

EXAMPLE IV

In order to determine the effect of the time of cure, other samples of the epoxide resin described in Example I were cured with $N^1,N^3$-di-sec-butyldiethylenetriamine at 100° C. for 16 hours. The results obtained under the long time cure were substantially the same as hereinbefore set forth for the 6 hour cure. Still another sample of the resin was cured with $N^1,N^3$-di-sec-butyldiethylenetriamine at 100° C. for 72 hours. A steel panel coated with the resin cured for 72 hours did not undergo cracking of the coating when subjected to bending in the manner described in Example III.

EXAMPLE V

As hereinbefore set forth, it is an essential feature of the present invention that the curing agent comprises $N^1$, $N^3$-dialkyldiethylenetriamine. This is demonstrated by comparing the results reported in Table I with those obtained when using N,N'-di-sec-butylethylenediamine as the curing agent. When another sample of the epoxide resin described in Example I was cured with 45.7 parts of N,N'-di-sec-butylethylenediamine per 100 parts of resin, the resin was very brittle after curing for 6 hours at 100° C. In contrast, the sample of resin cured with $N^1,N^3$-di-sec-butyldiethylenetriamine was very flexible after curing for 6 hours at 100° C.

EXAMPLE VI

The criticality of the $N^1,N^3$-dialkyl substitution is further demonstrated by comparing the results obtained using the $N^1,N^3$-dialkylidethylenetriamines with the results obtained using $N^1,N^3$-dicyclohexyldiethylenetriamine as the curing agent. Another sample of the epoxy resin described in Example I was cured in the same manner as described in Example II using $N^1,N^3$-dicyclohexyldiethylenetriamine as the curing agent. Although many of the other properties were similar to those obtained with the $N^1,N^3$-dialkyldiethylenetriamines, the flexural strength of the sample cured with $N^1,N^3$-dicyclohexyldiethylenetriamine was 8620 p.s.i. In contrast, the sample of resin cured with the $N^1,N^3$-dialkyldiethylenetriamines (Examples II, VII and VIII) all were very flexible and did not fracture in an attempt to obtain the flexural strength.

EXAMPLE VII

The curing agent of this example is $N^1,N^3$-diisopropyldiethylenetriamine. Another example of the epoxy resin described in Example I was cured using 32.8 parts of $N^1,N^3$-diisopropyldiethylenetriamine per 100 parts of resin at 100° C. for 6 hours. The results obtained using this curing agent were substantially the same as obtained using $N^1,N^3$-di-sec-butyldiethylenetriamine as reported in Examples I and II. The curing agent was soluble in the resin at room temperature and the cured resin had a tensile strength of from about 8520 to 9240 pounds per square inch, a flexural modulus of $3.8 \times 10^5$ and Shore D hardness of 83. Here again, the flexural strength was not obtainable because the cured resin did not fracture.

EXAMPLE VIII

The curing agent of this example is $N^1,N^3$-di-(1-ethyl-3-methylpentyl)-diethylenetriamine and was prepared by the reductive alkylation of diethylenetriamine with ethyl amyl ketone. In order to improve solubility in the resin, the mixture of curing agent and resin was heated to 50° C. When evaluated in the same manner as described in Example II, the following results were obtained. Samples of the epoxy resin described in Example I were cured with this curing agent at 100° C. for 6 hours. The tensile strength ranged from 7800 to 8320 p.s.i., the flexural modulus was $3.3 \times 10^5$ for ⅛" strips and $5.7 \times 10^5$ for ¼" strips. The heat distortion temperature was 50° C. and the Shore D hardness was 82. Here again, the cured resin was very flexible and did not fracture when an attempt was made to obtain the flexural strength.

EXAMPLE IX

The epoxide resin of this example is prepared by the reaction of epichlorohydrin with glycerol. The resin is prepared using about 3 moles of glycerol and 9 moles of epichlorohydrin in the presence of a diethyl ether solution of boron trifluoride. An exothermic reaction occurs and the mixture is cooled externally to maintain a temperature below about 75° C. After further working up the product, the glycidyl polyether is recovered as a pale yellow viscous liquid having a molecular weight of about 320 and an epoxide equivalent weight of about 155.

The epoxide resin formed in the above manner is subjected to curing with $N^1,N^3$-di-sec-pentyldiethylenetriamine at 100° C. for 4 hours.

We claim as our invention:

1. A method of curing epoxy resin containing more than one 1,2-epoxy groups which comprises mixing said resin with from about 5% to about 200% by weight of $N^1,N^3$-dialkyldiethylenetriamine and subjecting the resultant mixture to a curing temperature of from atmospheric to about 300° C.

2. A method of curing epoxy resin containing more than one 1,2-epoxy groups and formed by the reaction of epichlorohydrin and dihydric phenol, which comprises mixing said resin with from about 5% to about 200% by weight of $N^1,N^3$-dialkyldiethylenetriamine containing from 3 to 12 carbon atoms in each alkyl group, and subjecting the resultant mixture to a curing temperature of from atmospheric to about 300° C.

3. A method of curing epoxy resin containing more than 1,2-epoxy groups and formed by the reaction of epichlorohydrin and dihydric phenol, which comprises mixing said resin with from about 5% to about 200% by weight of $N^1,N^3$-di-sec-alkyldiethylenetriamine containing from 3 to 8 carbon atoms in each alkyl group and subjecting the resultant mixture to a curing temperature of from atmospheric to about 300° C.

4. The method of claim 3 further characterized in that said amine is $N^1,N^3$-diisopropyldiethylenetriamine.

5. The method of claim 3 further characterized in that said amine is $N^1,N^3$-di-sec-butyldiethylenetriamine.

6. The method of claim 3 further characterized in that said amine is $N^1,N^3$-di-sec-pentyldiethylenetriamine.

7. The method of claim 3 further characterized in that said amine is $N^1,N^3$-di-sec-octyldiethylenetriamine.

8. A method of curing epoxy resin containing more than one 1,2-epoxy groups and formed by the reaction of epichlorohydrin and polyalcohol, which comprises mixing said resin with from about 5% to about 200% by weight of $N^1,N^3$-dialkyldiethylenetriamine containing from 3 to 12 carbon atoms in each alkyl group, and subjecting the resultant mixture to a curing temperature of from atmospheric to about 300° C.

References Cited by the Examiner

UNITED STATES PATENTS

| | | | |
|---|---|---|---|
| 2,500,600 | 3/1950 | Bradley | 260—47 XR |
| 2,865,886 | 12/1958 | Greenlee | 260—47 |

FOREIGN PATENTS

| | | |
|---|---|---|
| 868,733 | 5/1961 | Great Britain. |

OTHER REFERENCES

Lee et al.: "Epoxy Resins," page 15 relied on, McGraw-Hill Book Co., Inc., New York, July 1957.

WILLIAM H. SHORT, *Primary Examiner.*

JOSEPH L. SCHOFER, *Examiner.*

T. D. KERWIN, *Assistant Examiner.*